United States Patent [19]

McGee

[11] Patent Number: 5,757,804
[45] Date of Patent: May 26, 1998

[54] METHOD AND APPARATUS FOR ELIMINATING OFFSET CALCULATIONS

[75] Inventor: Mitchell G. McGee, Plantation, Fla.

[73] Assignee: Racal-Datacom, Inc., Sunrise, Fla.

[21] Appl. No.: 675,950

[22] Filed: Jul. 5, 1996

[51] Int. Cl.$^6$ .................................................. H04J 3/06
[52] U.S. Cl. ...................... 370/510; 370/512; 370/514; 370/536; 375/368
[58] Field of Search ........................... 370/510, 509, 370/512, 514, 513, 470, 506, 907, 366, 517; 375/365, 366, 368, 372

[56] References Cited

U.S. PATENT DOCUMENTS

| | | | |
|---|---|---|---|
| 5,033,044 | 7/1991 | Williams et al. | 370/510 |
| 5,058,141 | 10/1991 | Kem et al. | 370/514 |
| 5,081,654 | 1/1992 | Stephenson et al. | 375/368 |
| 5,136,587 | 8/1992 | Obana et al. | 370/514 |
| 5,301,195 | 4/1994 | Hasegawa | 370/510 |
| 5,461,622 | 10/1995 | Bleickardt et al. | 370/907 |

OTHER PUBLICATIONS

International Standard ISO/IEC 13871, pp. 1–93, Information Technology—Telecommunications and Information Exchange Between Systems Private Telecommunications Networks—Digital Channel Aggregation, First Edition Dec. 15, 1995.

European Telecommunications Standard, pp. 1–33, Terminal (TE); Integrated Services Digital Network (ISDN) B–Channel Aggregation Unit (CAU); Procedures and Terminal Requirements, Final Draft prETS 300 481.

Article in *Data Communications*, Sep. 1993, pp. 107–114, entitled "Inverse Muxes: High Bandwidth, Low Cost", By S.E. Turner.

*Primary Examiner*—Benedict V. Safourek
*Assistant Examiner*—Kenneth Vanderpuye
*Attorney, Agent, or Firm*—Pedro Hernandez

[57] ABSTRACT

A data communication device (500) which is capable of providing inverse multiplexing, avoids having to perform address offset calculations by storing the incoming data from each of its incoming data channels in corresponding data buffers having predefined data structures which eliminate the need for offset calculations during data transfers and protocol processing. The communication device (500) compares the actual address location that a particular byte, such as a frame count byte, is presently stored in the data buffer and the address location it should be stored in order to avoid using offset calculations. If the actual location the frame count (FC) byte is located in is not the desired location the frame count byte should be located, the communication device (500) programs its SCCs (508, 510) to commence storing subsequent data bytes in the appropriate address locations in each of the data buffers found in memory (538) so as to avoid having to perform offset calculations during memory accesses.

16 Claims, 5 Drawing Sheets

METHOD AND APPARATUS FOR ELIMINATING OFFSET CALCULATIONS

FIELD OF THE INVENTION

This invention relates in general to the field of data communications, and more specifically to a method and apparatus for eliminating offset calculations during data transfers between inverse multiplexers.

BACKGROUND OF THE INVENTION

Inverse multiplexers are used for receiving high bandwidth input signals and breaking them up into multiple 56 or 64 kilobits/second (kbps) channels that can be carried over the public switched telephone network (PSTN) or a private data network. When receiving information, an inverse multiplexer provides the synchronization necessary to recombine the multiple channels back into a single high bandwidth signal.

Synchronization at the receiving end is necessary, since the subdivided 56 or 64 kbps channels may take vastly different paths through the network. Some signals may take longer to reach the receiving end since they may end up having to travel longer paths through the transmission circuits, some signals may be subject to longer transmission line delays, etc. Therefore, the inverse multiplexer must provide delay equalization adjustment through independent channel buffering at the receiving end in order to properly reassemble the incoming data.

Standardization of inverse multiplexers was started in the United States by the Bandwidth-on-Demand Interoperability Group ("Bonding"). The Bonding consortium is an inverse multiplexer vendor group which has helped propose international standards for inverse multiplexers. One such international standard is an International Organization for Standardization (ISO) standard, entitled "Information technology—Telecommunications and information exchange between systems—Private telecommunications networks-Digital channel aggregation, which is also referred to as ISO/IEC 13871. A second standard which is presently still in the draft (proposal) stage is from the European Telecommunications Standards Institute (ETSI, entitled "Terminal Equipment (TE) Integrated Services Digital Network (ISDN) B-channel aggregation; Procedures and terminal requirements, which is referred to as prETS 300 481.

In FIG. 1, there is shown a block diagram of two inverse multiplexer's 102 and 110 coupled to each other via a network 106, such as the PSTN. A high bandwidth customer application 102 such as video conferencing, video imaging, high volume file transfer, LAN bridge application, high resolution graphics, etc. generated by a user at site "A" is sent to inverse multiplexer 104. Inverse multiplexer 104 upon receiving the high bandwidth signal, proceeds to divide the signal into multiple channels for transmission over the network 106 in separate 56- or 64-bit/s switched digital circuits.

At the receiving end, inverse multiplexer 108 recombines the traffic from the multiple channels back into the single high bandwidth signal for presentation to the customer at site "B". Since the inverse multiplexers 104 and 108 do not have control over the multiple switched digital circuits selected to transport the multiple channels over the network 106, signal routing delays can have a serious effect on the performance of the inverse multiplexers. When receiving the multiple channels, inverse multiplexer 108 must synchronize and align the multiple incoming data channels in order to reconstruct the high bandwidth customer application 102 sent from site "A".

In order to facilitate the synchronization efforts of inverse multiplexers, the multiple data channels are further broken down into a sequence of frames. As shown in FIG. 2, each frame 200 consists of 256 octets or bytes comprising 8 data bits each. Each frame includes four octets located at bytes No. 64, 128, 192 and 256, which are used for overhead purposes and 252 bytes used for data (labeled "D") transport purposes. The frame alignment word (FAW), located at byte number 64, is used by the inverse multiplexers 104, 108 to align incoming frames. The FAW octet allows the inverse multiplexer's receiver to align incoming frames and multiframes. The information channel (IC) overhead octet, located at byte number 128, is used by the inverse multiplexers 104, 108 in order to exchange call parameters with each other. This byte helps transfer control information between the two end points. Information carried by the IC octet includes channel identifier information as well as in-band control information exchange. The Frame Count octet (FC), located at byte number 192, is used to measure the time delay between individual incoming data channels. The FC octet is incremented once every frame and rolls over on a multiframe boundary.

Individual frames 200 are grouped into multiframes which include 64 frames. A conventional 64 frame multiframe is shown in FIG. 3. The value of the FC byte will range from 0 to 63, with an FC=0 denoting the first frame in a multiframe and FC=63 denoting the last frame in a multiframe. A counter located in the inverse multiplexer is incremented every time a FC byte is detected. This counter is cleared to zero, every time a new multiframe (64 consecutive frames) commences such that the first frame in a multiframe will have a frame count (FC) of zero. The final overhead byte found in frame 200, is the CRC octet, located at byte number 256. The CRC byte provides conventional error checking as known in the art. The CRC byte helps ensure that the data received is reliable and has not been corrupted.

Since the inverse multiplexer receiving incoming data channels has no control over the network (e.g., PSTN) which is transporting all of the data channels, there exists a good chance that there will be variations in the delay each data channel experiences while traveling through the network's circuits, as previously mentioned. Given that the receiving inverse multiplexer has to reassemble the original high bandwidth data stream, delay adjustment or equalization is very important at the receiving end.

Some inverse multiplexers resolve delay equalization by using independent channel buffering for each of the incoming channels. Once all of the channels are synchronized using the FAW bytes, the delay in each channel is determined by time stamping the FC byte in each channel frame. Appropriate delay is imposed on the incoming data from each of the channels by buffering that channel's data to match the longest delay experienced on any of the incoming data channels. As incoming data frames are received at the inverse multiplexer, each incoming data channel will have its own data buffer area which the inverse multiplexer uses to temporarily store the incoming data prior to the data in all of the channels being reassembled (aggregated). All incoming channels are delayed in order to match the channel having the worst-case delay with the other channels, in essence time-aligning the channels. Once properly time-aligned, the data channels are realigned and synchronized in order to properly reconstruct the high bandwidth data stream sent by the remote inverse multiplexer.

Presently, in order to reassemble all of the buffered channels back into one high bandwidth data stream, it is required to determine a buffer offset for each of the data buffers, since the incoming data is simply arbitrarily stored in each channels corresponding buffer area as it comes in. The buffer offset is the address offset between the starting address of each of the data buffer areas within memory, and the starting location of the data frames stored in the buffer areas. This buffer address offset has to be used in all subsequent buffer accesses to determine the proper address locations of the data frames located in each of the assigned buffer areas for protocol processing and data transfer. It could very well be that each buffer area may have a different buffer offset since data frames may be stored differently in each buffer area.

Using a buffer offset when performing channel aggregation or protocol processing requires enough controller (CPU) power to be able to accomplish the data transfers within the allotted time, since each transfer is burdened by the added CPU cycles required to perform the buffer offset calculations when performing data transfers or protocol processing. In cases were the existing controller does not have the extra power to support such offset calculations, the hardware has to be modified to include a more powerful controller (e.g., a faster microprocessor which can perform more instructions per second). This however will tend to add additional cost to the design of the inverse multiplexer. Accordingly, a need exists for a method and apparatus which can avoid having to use time consuming and sometimes costly buffer offset calculations during data transfers and protocol processing.

DETAILED DESCRIPTION OF THE PREFERRED EMBODIMENT

Figure 4:
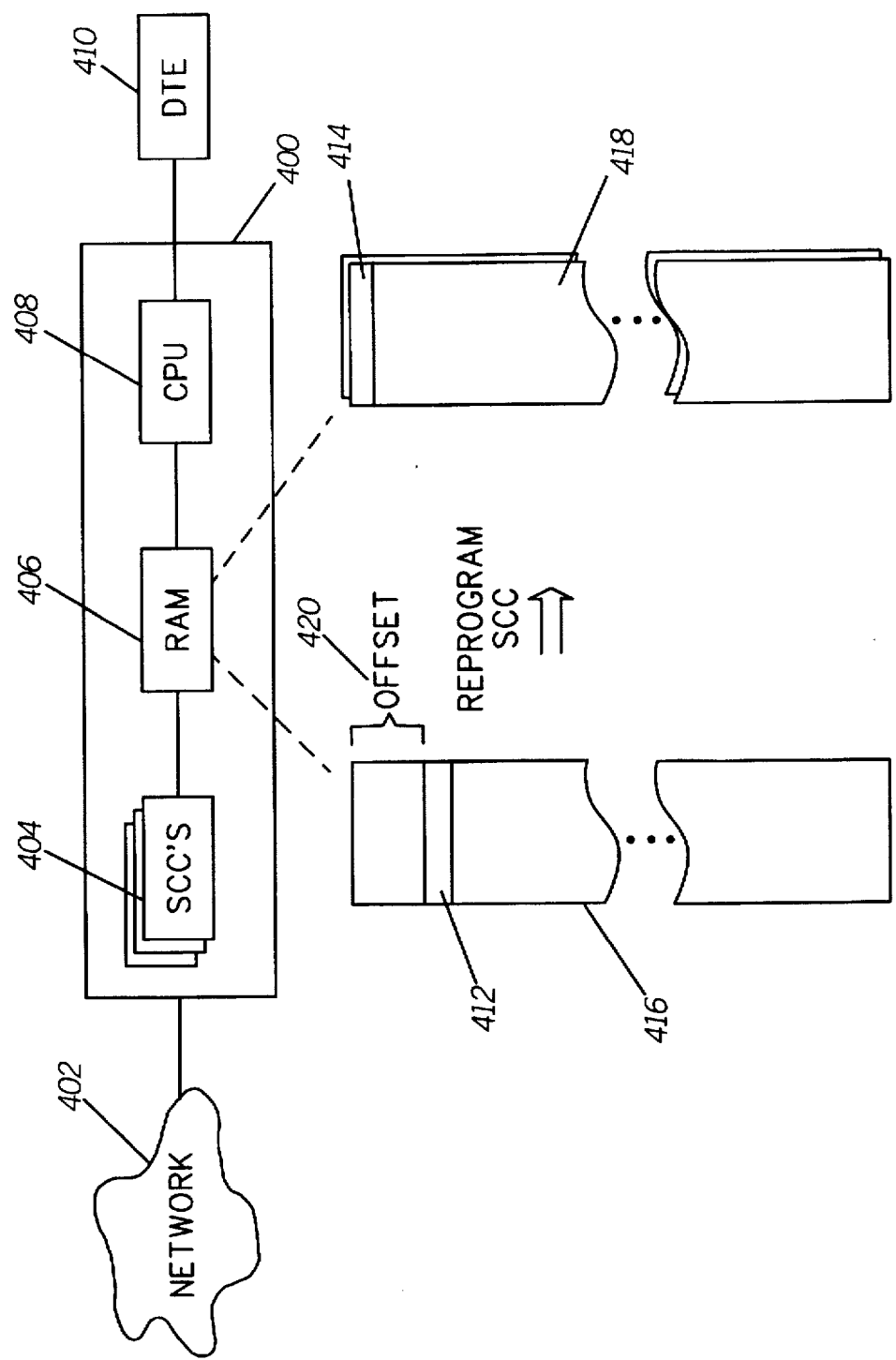
FIG. 4 shows a simplified diagram of an inverse multiplexer highlighting the memory buffer in accordance with the invention.

Referring now to the drawings and specifically to FIG. 4, there is shown a simplified block diagram of an inverse multiplexer in accordance with the present invention. I-mux 400 is shown coupled to a digital switched network 402. Network 402 can take the form of a public network, such as the public switched telephone network (PSTN), or it can be a private network. I-mux 400 includes a plurality of serial communication controllers (SCCs) 404. The SCC's 404 are coupled to a random access memory (RAM) 406 which is used to temporarily store data. One SCC 404 is used for each of the incoming channels that needs to be aggregated. A controller 408 controls the overall operation of I-mux 400. In the preferred embodiment, the SCCs 404 which support the incoming data channels are integral to controller 408. The I-mux 400 is shown attached to a DTE 410 which can provide high bandwidth data to/or receive high bandwidth data from I-mux 400.

In accordance with the prior art, as incoming data is received by the SCC's for each of the incoming channels, the data is placed in corresponding buffer area(s) 416. Note that although one buffer area 416 is shown, each incoming channel would have an associated buffer area located within memory (e.g., RAM) for storage of its incoming data prior to the frames in each of the buffer areas being reassembled. For example, if I-mux 400 supported the aggregation of two channels, there would be two buffers areas 416 located in memory.

Since the start of each frame can vary in its location in each of the assigned buffer area(s) 416, an offset 420 would be required to be calculated and used, each time data was accessed from each of the buffer area(s) 416 in order to merge the data from each of the buffer area(s) 416 which support each of the incoming data channels. The offset 420 would have to be used in all subsequent buffer access calculations in order to determine the exact address location of the data for protocol processing and data transfers as previously mentioned. It is worth noting that each data channel's buffer area would in all likelihood have a different address buffer offset given that incoming data on each individual incoming data channel may be stored differently as it comes in. Having to use a buffer address offset 420 each time data has to be retrieved from buffer(s) 416 slows down the data accessing task and in turn slows down the overall data reassembly (aggregation) process for the I-Mux 400.

In accordance with the present invention, instead of having to add a different offset 420 each time data has to be retrieved from each of the individual data buffer area(s) 416, the present invention uses the unique buffer offset 420 calculated for each of the individual data buffer(s) 416 to program the hardware (in particular the SCCs 404) to place data in a predefined data structure in each of the data buffer area(s) 416. This in turn causes the frame bytes stored for each multiframe in each of the data buffers to be located at predetermined memory address locations, avoiding the need for address offset calculations each time data is accessed. The fact that the storage locations of all of the frame octets are preferably predefined the same way for all of the data buffer area(s) 416 which support the incoming data channels, simplifies and speeds up the protocol and data transfer routines. The elimination of the buffer offset 420 is shown in buffer 418.

Preferably, the first byte of the first data frame for each incoming multiframe is preferably stored starting at the first address location 414 of data buffer 418, this in effect avoids the need for using address offsets. Since this is done for each incoming data channel's buffer area, one pointer can be used to access the corresponding byte for each data channel without having to use different address buffer offsets for each of the buffer area(s) 416. This in effect speeds up the aggregation process of reassembling the bytes from each of the incoming data channels into one high bandwidth signal at the receiving inverse multiplexer. A detailed discussion on how the present invention avoids having to use offset calculation during channel aggregation will be described in detail later on below.

Figure 5:
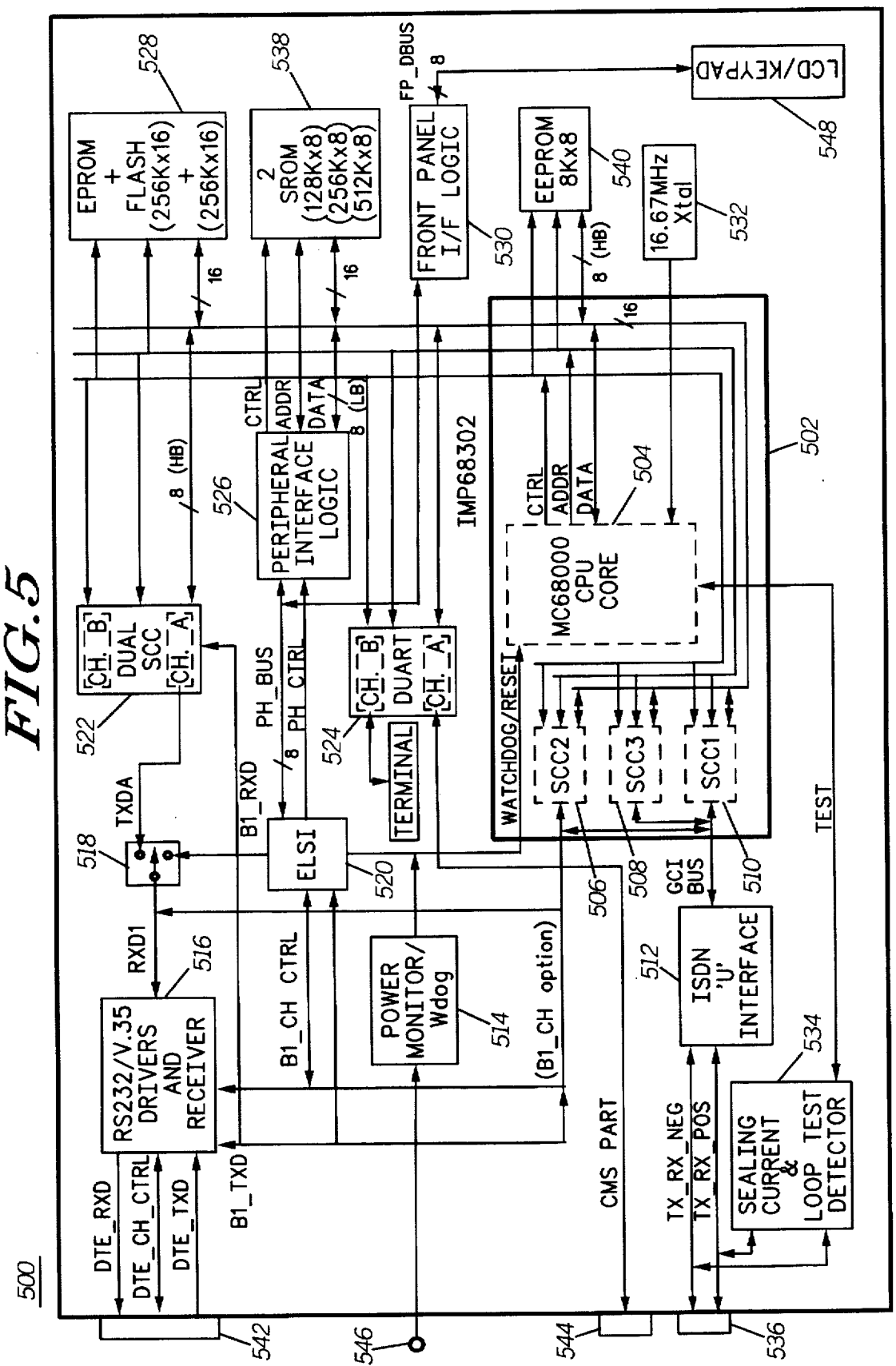
FIG. 5 shows a block diagram of a data communication device in accordance with the invention.

In FIG. 5, there is shown a detailed block diagram of a data communication device such as an Integrated Services Digital Network ("ISDN") terminal adapter 500 supporting inverse multiplexing in accordance with the present invention. Terminal adapter 500 in the preferred embodiment comprises an Exclaibur BRI 2000 manufactured by Racal-Datacom, Inc. Terminal adapter 500 is functionally divided into seven major sections: integrated microprocessor, memory, DTE interface, ISDN U-interface, voltage detection, front panel interface, network management interface and Terminal interface.

The terminal adapter 500 includes an integrated microprocessor or controller 502 running at a clock rate of 16.67 Mhz, the clock speed is set by crystal 532. In the preferred embodiment, controller 500 comprises a MC68302 microcontroller manufactured by Motorola, Inc. The controller 500 controls data exchange between an input/output terminal 536 and an ISDN U-interface 512. Microprocessor 502 includes the following on-chip devices: interrupt controller, serial channel DMA controller (SDMA), dual port RAM, two general purpose timers, watchdog timer, four programmable chip-select lines with wait state generation logic, and three independent full-duplex serial communication controllers (SCCs) 506–510. Controller 502 also includes an MC68000 core central processing unit 504.

The MC68302's interrupt controller has the ability to accept and prioritize both internal and external interrupt requests and then present the highest priority request to the M68000 core 504. An interrupt acknowledge bus cycle is then initiated after the completion of the current instruction. At that time the interrupt controller places the corresponding interrupt vector onto the M68000 bus. The CPU core 504 then reads the vector, extracts the interrupt handler address from the vector table, and begins execution of the current interrupt handler. Each of the SDMA channels is permanently assigned to service the receive or transmit operation of one of the SCCs 506–510. The channel is always available regardless of the SCC protocol chosen. All six of the SDMA channels will be utilized: one transmit and receive pair allocated to each SCC. An active SDMA channel will request the M68000 system bus and remain bus master for only one bus cycle.

SCC1 510 provides access to the ISDN D-channel for call access, SCC2 506 provides the ISDN B1-channel or optional synchronous data port (DCE), and SCC3 508 provides the ISDN B2-channel functions. Also included as part of terminal adapter 500 is an external dual SCC 522 which is included to provide asynchronous data transmission to the DTE ports 542.

SCC2 506 and SCC3 508 are of main concern with regard to the preferred embodiment of the present invention given that these act as input terminals for the two data channels which provide the incoming data that is eventually merged or aggregated in accordance with the invention. Each SCC has two serial DMA channels, one for transmit and one for receive. Each SCC 506–510 also has separate transmit and receive FIFOs. The length of the transmit FIFO is either three bytes or four words deep, and the length of the receive FIFOs are either 3 bytes or 3 words deep, depending upon the protocol chosen. The controller's internal communications processor is responsible for implementing the user-chosen protocol and controlling the SDMA channels that transfer data between the SCCs and memory.

The operation of each SCC 506–510 is configured through the use of three 16-bit, memory-mapped, read/write registers. Each SCC 506–510 includes two serial DMA channels, one for transmit and one for receive. These are setup through a parameter RAM buffer descriptor table. One can on a buffer-by-buffer basis, select the data transfer to occur between the SCC and external memory or the SCC and the internal dual-port RAM that is available. Each SCC 506–510 has a unique set of buffer descriptors to allow this selection. The buffer descriptors are located in each channel's buffer descriptor table which allows the programmer to define up to 8 buffer areas in memory for the receive channel and 8 for the transmit channel. The buffer descriptors act as pointers to the storage buffer areas. Each buffer can have a maximum length of 64K bytes and forms a circular queue. Preferably, once a buffer area is full, the buffer wraps around and writes over previously stored data. In the preferred embodiment, data is transferred in 64 byte chunks into the storage buffers, 64 bytes being a multiple of the 256 byte incoming frames shown in FIG. 2.

Each SCC also has the ability to internally loop back the transmitter output to the receiver input. In this mode, the external transmitter output can be enabled or disabled. The SCCs can also be setup in an auto echo mode in which the received data is retransmitted on a bit-by-bit basis. In this mode the controller 502 can still monitor the received data.

The controller 502 contains 1152 bytes of dual-port RAM which isolates the controller bus from the internal peripheral bus. The dual-port RAM is used for data communication between the M68000 core 504 and the on-chip serial communication controllers 506–510. 576 bytes are used for system RAM and 576 bytes are used for parameter RAM. The parameter RAM area includes pointers, counters, and registers used by the serial communication controllers. The system RAM is a general purpose RAM which can be used as data and/or program RAM or as microcode storage for the communications processor.

In the 16-bit mode, the controller 502 provides 23 Address lines and 16 data lines, allowing access to 16 mega bytes of addressing space. The addressing of the memory space for the terminal adapter 500 is divided three main memory blocks: EPROM+Flash block 528, static random access memory ("SRAM") 538 and electrically erasable programmable read-only memory ("EEPROM") 540. The EPROM/FLASH 528 is used for boot-up, power-on diagnostics and will hold the latest executable system code available at the time of manufacturing of terminal access device 500. Block 528 includes one 256K×16 EPROM and one 256K×16 Flash EPROM. The FLASH EPROM can be updated via local or remote downloads. The flash EPROM of block 528 can be programmed with the latest system code available.

SRAM memory 538 preferably comprises two 128K×8 SRAMs which are used for data storage and packet shuffling between the terminal and the ISDN channel. SRAM 538 can be upgraded in size if storage needs require. EEPROM 540 is used to provide non-volatile storage for configuration parameters.

One synchronous/asynchronous user data port 542 is provided via one standard DB25 connector. Conventional RS232 and V.35 drivers and receivers 516 are connected to the data port 542. The communication mode (RS232 or V.35) can be manually selected via a jumper located in block 516. This interface is physically configured as a DCE. Driver/receiver block 516 is electrically coupled to the SCCs as well as the ELSI 520, with the Tx and Rx data signals coupled to the ELSI 520. The TTL side of the RS232E/V.35 drivers and receivers are connected to three main components in the board. The flow control signals are connected to the SCC2 506 as well as the ELSI 520. A Tx/Rx switch 518 is provided to properly route RX and TX data from/to driver/receiver block 516. The flow control signals come/go to the ELSI 520 and the data is routed based on the selected Protocol. If it is Synchronous data, the data is routed from/to the ELSI 520, otherwise if the Asynchronous Protocol is selected, data is routed from/to the external SCC 522.

Power connector 546 provides connection to the external power supply (not shown) which powers terminal adapter 500. Power connector 546 is electrically connected to a conventional power monitoring/watchdog circuit 514 which monitors the incoming line conditions and sends a reset signal to central processing unit 504 when line conditions warrant. The internal watchdog timer provides a means to escape from unexpected system failures. The watch-dog timer can be programmed to provide for a specific time-out period. If the timer reaches the predetermined terminal count, the counter asserts a pin on controller 502 for a period of 16 master clock cycles and issues an interrupt to the interrupt controller.

A front panel interface logic circuit 530 provides interface to a user interface such as a liquid crystal display (LCD) and switch keypad 548. In the preferred embodiment the LCD display comprises a 2 row by 16 character alphanumeric display. The Keypad provides a plurality of switches for entry of test information, system information, system password entry, changing unit configurations, etc. A network management interface port (NMI) 544 provides for interconnection to an external management device, which can remotely monitor the operating condition of terminal adapter 500. DUART 524 provides asynchronous data transmission to the local network management interface port 544. Peripheral interface logic 526 coverts the processor's electrical interface into one that is compatible with the peripherals' electrical interface. Finally, a sealing current and loop test detector 534 is used to recognize network initiated diagnostic loop back tests.

Although the above discussion has reviewed the entire electrical structure for terminal adapter 500, with regard to the preferred embodiment, the circuitry of main concern is SCC2 506 and SCC3 508 located within controller 502 which are the SCCs which receive the two incoming data channels, the rest of controller 502 which executes the steps in accordance with the invention, and RAM 538 which temporarily stores the incoming information before it is reassembled and sent to the DTE which is attached to the terminal adapter 500 at port 542.

Figure 6:
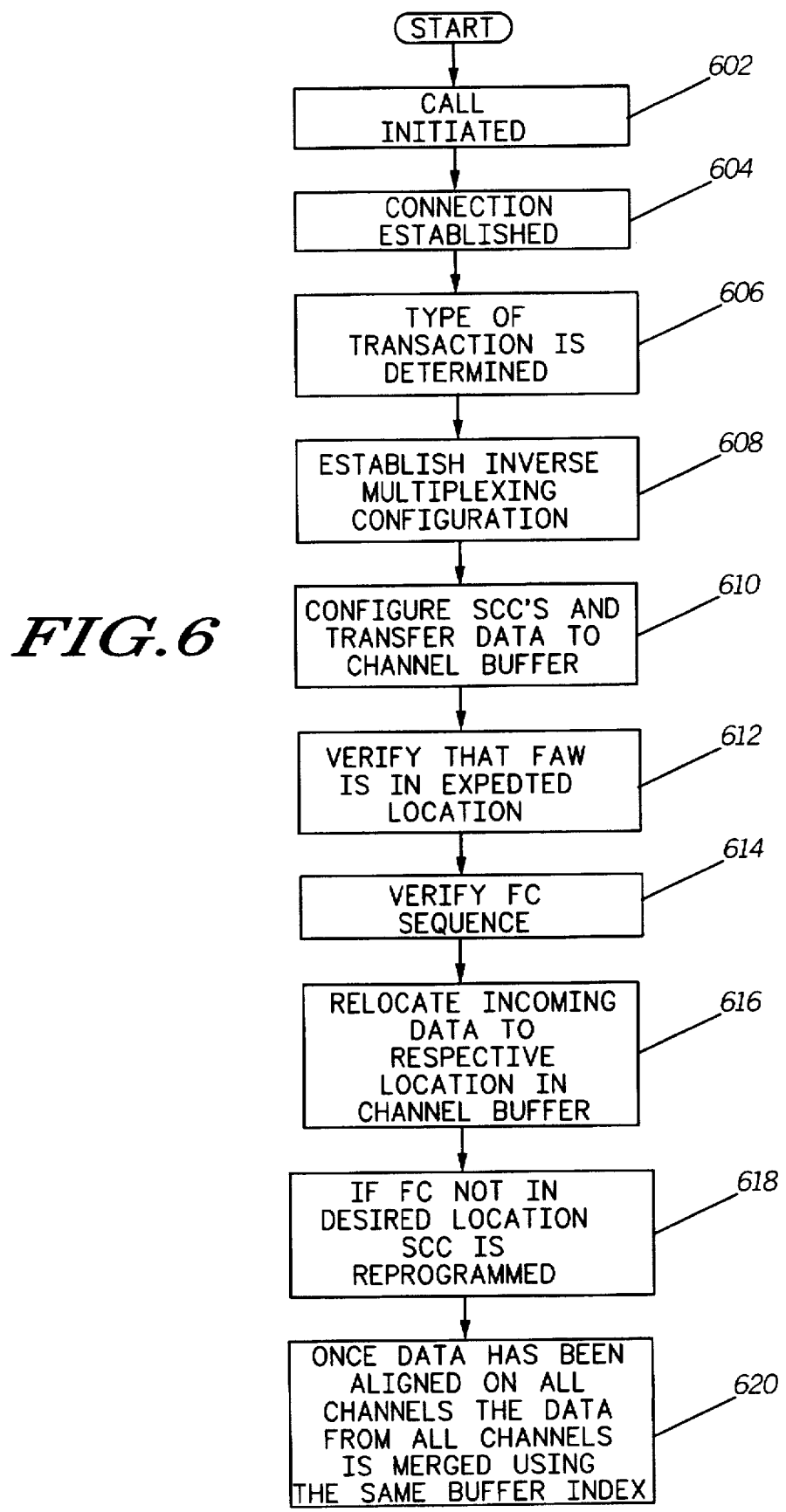
FIG. 6 is a flowchart which shows the steps taken in order to avoid having to use offset calculations in accordance with the present invention.

In FIG. 6, a flow chart which highlights the sequence of operations involved in the inverse multiplexing data transfer technique of the present invention is shown. Once a call is initiated in step 602, the initial connection is established between the data communication devices in step 614, and the inverse multiplexing process in accordance with the invention is invoked. In step 606, the type of transaction is determined at the data communication device to be either an out going transaction where the device is transmitting information (call type), or an in coming transaction where the device is going to be receiving data (answer type). In a call type transaction, the device assumes the calling end point (CEP) role, and in an answer type transaction, the device assumes the answering end point (AEP) role.

The device which is the CEP will transmit in step 608 the desired inverse multiplexing configuration by repeatedly transmitting an information message using the entire initial channel bandwidth. The AEP will reply with its desired configuration, by also transmitting the information message using the entire initial channel bandwidth. After the CEP receives an acceptable configuration, it will begin transmission of the multiframes. The AEP will also begin transmission of the multiframes when it receives the multiframe from the CEP.

In step 610, the data communication devices at both end points will configure their respective SCC's (Serial Communication Controllers) to search the incoming bit stream for the frame alignment word (FAW) which provides byte synchronization for the receiving I-mux. When the SCC finds the FAW, it will transfer the unaligned data frames into its channel buffer (multiframe storage buffer) located in RAM 538. The channel buffer for each incoming channel in accordance with the preferred embodiment will have a length of 16,384 bytes. This is the exact same size as the number of data bytes found in each multiframe (256 data bytes times 64 frames) in accordance with the BONDING standard. A key to understanding the present invention is to realize that each incoming byte (octet) can be uniquely identified by its frame number (by determining the value of the FC byte) within each multiframe and the byte number within that particular frame.

When the SCC (either SCC2 506 or SCC3 508 depending on the incoming channel in question) begins to transfer data into its corresponding multiframe buffer area found in RAM 538, the CPU 504 is notified via an interrupt. The CPU 504 will then verify in step 612, that the FAW is in its expected location for several frames to ensure that the SCC 508 or 510 has correctly byte aligned (synchronized) with the incoming bit stream. Once the CPU 504 has successfully integrated the FAW overhead byte, it can begin the process of verifying the proper sequence of the Frame Count octet (FC). Because the CPU 504 has verified that the FAW is in its correct location, it can safely expect the FC byte to also be in its correct location in the data frame since it knows how many bytes away from the FC byte the FAW byte is located in each frame. Looking at the frame structure shown in FIG. 2, the FAW byte located at byte 64, is 128 bytes away from the FC byte, which is located at byte number 192.

Figure 1:
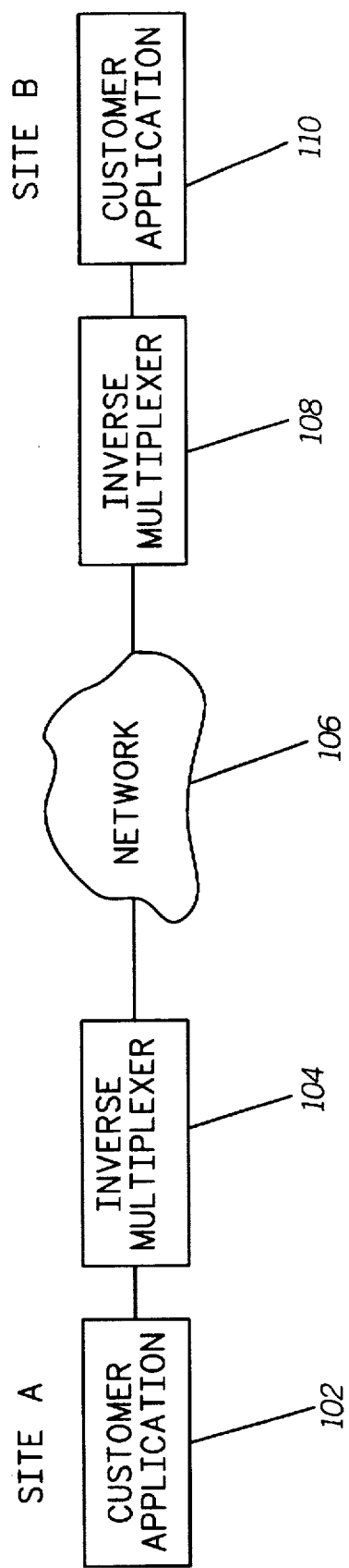
FIG. 1 shows a block diagram of two inverse multiplexers connected to each other via a network.
Figure 2:
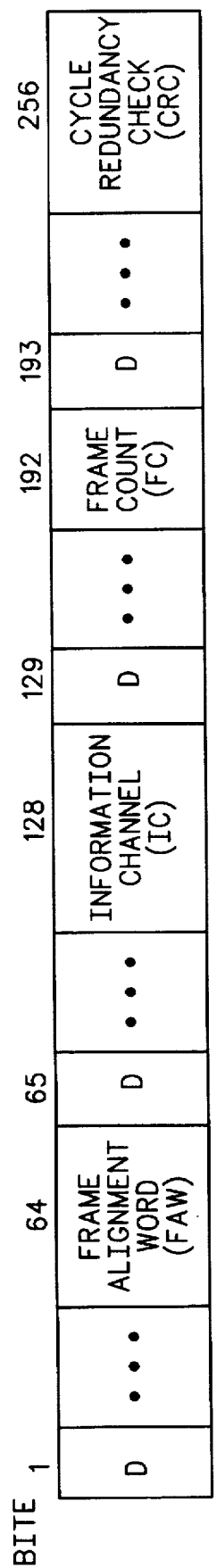
FIG. 2 shows a diagram of a conventional frame as used by inverse multiplexers.
Figure 3:
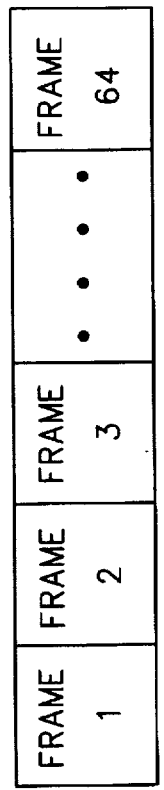
FIG. 3 shows a diagram of a conventional multiframe as used by inverse multiplexers.

After verification of the proper FC sequence in step 614, the CPU 504 will begin the process of relocating the incoming data for each incoming data channel to its desired location in the corresponding channel buffer area in step 616. The relocation process reads the value of the FC byte and compares its arbitrary location to its desired or absolute location within the corresponding data buffer. If the FC byte is in the desired location within the overall buffer area which would avoid having to use address offsets, the process is done. As an example, if the FC byte which is read has a value of 10, denoting the 11th frame within that particular multiframe (since frames within a multiframe are numbered from 0 to 63), the controller 502 calculates the desired address location within the data buffer area that the FC byte should be located in. The controller 502 determines the byte location within the storage buffer area by multiplying the value of the FC byte (10) by the number of bytes per frame (256 bytes as shown in FIG. 2 for the preferred embodiment) and adding 192 which is the byte location within each frame for the FC byte, which will be referred to as the frame count offset. This gives a desired location of byte number 2752 within the 16,382 byte long storage buffer area. Note that the starting address of each storage buffer area in RAM is established by the designer using the SCC's buffer descriptor and can be anywhere in memory. So in order to get the absolute address in which this FC byte should be located in RAM, this information needs to be taken in view of the actual starting address location for that particular storage buffer in order to properly reprogram the SCC's buffer descriptor. As another example, if the value of the FC byte equals zero (denoting the first frame in the multiframe), its address location within the particular storage buffer area would be calculated by (0×256)+192 which equals location 192 (the frame count offset) within the 16,382 byte long storage buffer area.

If the arbitrary location the FC byte is stored within the buffer area is not the desired location as calculated above, the CPU 504 is used to reprogram the corresponding incoming data channel SCC (SCC2 506 or SCC3 508) in step 618 in order to force the appropriate SCC 506 or 508 to place the incoming data into the desired location. This is accomplished by reprogramming the corresponding SCC's buffer descriptor such that the FC byte is stored in the desired location within the storage buffer.

After the SCC 506 or 508 has been reprogrammed; the location of the FC byte is verified, if the verification fails, the above process is repeated. The above data alignment procedure is repeated on all channels. This alignment process guarantees that all the data octets which follow will be in there predetermined or absolute locations within each data buffer. Preferably, with the first byte of the first frame of a multiframe located in the first address location of the data buffer and the last byte of the last frame of the multiframe located in the last address location of the data buffer.

By properly aligning the incoming data into each of the data buffers for each incoming channel, the data processing software is simplified. The simplification will reduce the CPU bandwidth required to perform the channel aggregation at the receiving I-mux. Once all channels have been properly aligned, the delay equalization process is complete. The data pump software that is used to merge the data stored for each of the individual data channels together can therefore use the same buffer index in order to address all of the channel buffers, since all of the data is properly aligned in each storage buffer. As previously mentioned, in accordance with the preferred embodiment, each storage buffer can store the exact number of bytes found in each incoming multiframe (16,384 bytes). Once properly aligned in accordance with the invention, the first byte of each incoming multiframe is stored in the first address of its corresponding storage buffer. All of the following bytes are then stored consecutively all the way to the last byte of the multiframe which is stored in the last address location within each storage buffer area in memory. This process is done for each of the incoming data channels, so that all storage buffers are aligned with respect to each other. This simplifies the reassembly process for the inverse multiplexer since no offsets have to be used when accessing information. Typically, without the present invention, most of the data channels would have a different address offset that would have to be used when accessing data from the buffers.

By using the buffer offset to program the hardware (the SCC's buffer descriptor) to place the incoming data in the same predefined data structures within each buffer area, allows the frame bytes to be located at predetermined memory locations in all of the buffer areas. Thus eliminating the requirement to include any buffer offset address calculations during data transfers or protocol processing. The fact that the locations of all of the frame elements are predefined within each buffer area, simplifies and speeds up the protocol and data transfer among all of the data buffers. Once all of the incoming data channels are properly aligned in their corresponding multiframe storage buffers, the data bytes from each of the data channels can be reassembled easily, since incoming multiframe bytes are stored in the same order in each of the storage buffer areas.

In situations in which the available controller does not have the available data processing power to handle the added cycle times required to perform address offset calculations, the present invention solves the problem and avoids the added cost of using a higher power processor.

While the invention has been described in conjunction with specific embodiments, it is evident that many alternatives, modifications, permutations and variations will become apparent to those skilled in the art in light of the foregoing description.

What is claimed is:

1. A method for eliminating offset calculations in a data communication device which receives data frames which are grouped into multiframes, comprising the steps of:
   (a) detecting a synchronization pattern in one of the received data frames;
   (b) storing the incoming data frames into a memory area;
   (c) locating a frame count byte in one of the data frames;
   (d) determining the address location in the memory area in which the frame count located in step (c) is stored in; and
   (e) adjusting the address location the frame count byte is stored in the memory area if the frame count is not stored in the address location which corresponds to the address in the memory area which would avoid having to use an address offset.

2. A method as defined in claim 1 wherein each of the data frames includes a frame count byte which indicates the frame number of that data frame within its corresponding multiframe, and each data frame includes a synchronization pattern and wherein the frame count located in step (c) is located in the same data frame as the synchronization pattern detected in step (a).

3. A method as defined in claim 2, wherein the memory area comprises a storage buffer which has the same memory size as the amount of bytes found in each of the multiframes, and the storage buffer is overwritten each time a new multiframe is received.

4. A method for eliminating offset calculations in an inverse multiplexer device which receives at least two channels of incoming information, the information received at each of the at least two channels comprise data frames which are grouped into multiframes, the data frames each including a plurality of bytes, comprising the steps of:
at each of the at least two channels:
   (a) storing the incoming data frames into a multiframe storage buffer which can store the same number of bytes of data as found in each of the multiframes which are received;
   (b) locating a frame count byte in one of the data frames;
   (c) determining the address location in the multiframe storage buffer in which the frame count byte is stored in;
   (d) determining if the frame count byte is stored in the address location in the multiframe storage buffer which corresponds to the address location which would avoid having to use an address offset when addressing the frame count byte; and
   (e) adjusting the address location the frame count byte located in step (b) is stored in the multiframe storage buffer if it is determined in step (d) that the frame count byte is not stored in the address location which would avoid having to use an address offset.

5. A method as defined in claim 4, wherein all incoming data is aligned to the address location the frame count byte is adjusted to in step (e) so that all new incoming data stored in the multiframe storage buffer is stored in the address locations within the multiframe storage buffer which will avoid having to use an address offset to address.

6. A method as defined in claim 4, wherein step (b) comprises the steps of:
   (b1) detecting a synchronization pattern in one of the incoming data frames; and (b2) determining the address location within the multiframe storage buffer where the frame count byte is stored in by moving a predetermined number of address locations away from the address location the detected synchronization pattern is stored.

7. A method as defined in claim 4, wherein the multiframe storage buffer is overwritten each time a new multiframe is received.

8. A method as defined in claim 4, wherein each of the multiframes received by the inverse multiplexer includes the same number of data frames and each data frame has the same number of bytes, and each of the at least two channels has its own multiframe storage buffer, and wherein step (d) comprises the steps of:

(d1) determining the value of the frame count byte located in step (b);

(d2) multiplying the value of the frame count byte by the size of the multiframe and then adding a frame count offset in order to determine the address location in the multiframe buffer the frame count byte should be stored in so as to avoid having to use an address offset when address addressing data stored in the multiframe storage buffer; and (d3) comparing the address location determined in step (c) with the address location determined in step (d2) in order to determine if they match.

9. A method as defined in claim 8, wherein step (e) comprises changing the address locations in which the multiframe bytes are stored in the multiframe storage buffer so that the address location of the frame count byte located in step (b) equals the address location determined in step (d2).

10. A method as defined in claim 9, comprising the further step of:

(g) storing all of the bytes following the frame count byte in consecutive address locations in the multiframe data buffer.

11. An inverse multiplexer, comprising:

a first input terminal for receiving incoming data frames which are grouped into multiframes from a first data channel;

a controller coupled to the input terminal;

a first storage buffer coupled to the controller for storing the incoming data frames from the first data channel; and the controller in response to detecting a frame count byte in one of the incoming data frames, determines the address location within the first storage buffer which the detected frame count byte should be stored in order to avoid having to use an address offset when the first storage buffer is addressed, and adjusts the address location the detected frame count byte is stored within the first storage buffer, if it is determined by the controller that the frame count byte is not stored in the proper address location within the first storage buffer.

12. An inverse multiplexer as defined in claim 11, further comprising:

a second input terminal coupled to the controller for receiving incoming data frame which are grouped into multiframes from a second data channel;

a second storage buffer coupled to the controller for storing the incoming data frames from the second data channel; and the controller in response to detecting a frame count byte in one of the incoming data frames from the second input terminal, determines the address location within the second storage buffer which the detected frame count byte should be stored in order to avoid having to use an address offset when the second storage buffer is addressed, and adjusts the address location the detected frame count byte is stored within the second storage buffer if it is determined by the controller that the frame count byte is not stored in the proper address location within the second storage buffer.

13. An inverse multiplexer as defined in claim 12, wherein the first and second storage buffers can store the same number of bytes as found in each multiframe that is received at the first and second input terminals.

14. An inverse multiplexer as defined in claim 13, wherein the address locations in the first and second storage buffers are overwritten each time the inverse multiplexer begins receiving new multiframes at the first and second input terminals.

15. An inverse multiplexer as defined in claim 12, wherein the controller prior to detecting the frame count byte in either of the first or second data channels becomes aligned with the incoming data by aligning with a synchronization pattern sent in each data frame.

16. An inverse multiplexer as defined in claim 15, wherein the data located in the first and second storage buffers are merged together using a single buffer index.

* * * * *